United States Patent
Kamakura et al.

(10) Patent No.: US 6,922,825 B1
(45) Date of Patent: Jul. 26, 2005

(54) SYSTEM ANALYSIS APPARATUS AND METHOD, AND STORAGE MEDIUM STORING SYSTEM ANALYSIS PROGRAM

(75) Inventors: Jyunichi Kamakura, Chiba (JP); Kazuya Baba, Chiba (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/553,316

(22) Filed: Apr. 20, 2000

(30) Foreign Application Priority Data

Sep. 27, 1999 (JP) .......................................... 11-271608

(51) Int. Cl.[7] ................................................ G06F 9/44
(52) U.S. Cl. ........................ 717/125; 717/127; 717/130
(58) Field of Search ................................ 717/125, 127, 717/130, 154–161

(56) References Cited

U.S. PATENT DOCUMENTS

| | | | | |
|---|---|---|---|---|
| 5,161,216 A | * | 11/1992 | Reps et al. ................. | 717/151 |
| 5,335,344 A | * | 8/1994 | Hastings ..................... | 714/35 |
| 5,937,195 A | * | 8/1999 | Ju et al. ...................... | 717/156 |
| 6,085,035 A | * | 7/2000 | Ungar .......................... | 717/153 |
| 6,247,175 B1 | * | 6/2001 | Ledford et al. ............. | 717/157 |
| 6,430,741 B1 | * | 8/2002 | Mattson et al. ............. | 717/154 |
| 6,449,711 B1 | * | 9/2002 | Week .......................... | 712/223 |

* cited by examiner

Primary Examiner—Todd Ingberg
Assistant Examiner—Qamrun Nahar
(74) Attorney, Agent, or Firm—Staas & Halsey LLP

(57) ABSTRACT

The object of the present invention is to analyze association relationships between data items and processes being used in an existing system. By analyzing a program or the like, the type and numbers of access instructions to data items in each step of the program is examined (step 13). Then, data item association degree is calculated from the type of access instruction etc., and the values of the association degree are corrected using system requirements etc (step 15 and step 17). Processes having high association degrees are collected together by referencing the corrected valves of the association degree (step 21). Based on the groups of collected processes, process division and data item partitioning is performed (step 23). Interfaces between processes are then displayed based on divided processes and partitioned data items (step 25).

10 Claims, 11 Drawing Sheets

| PROGRAM | SECTION | STEP | DATA ITEM | ACCESS TYPE |
|---|---|---|---|---|
| Pgm11 | Sec111 | 1 | D11 | READ |
| Pgm11 | Sec111 | 1 | D12 | READ |
| Pgm11 | Sec111 | 4 | D11 | UPDATE |
| Pgm11 | Sec111 | 4 | D12 | UPDATE |
| Pgm11 | Sec111 | 4 | D22 | UPDATE |
| . | . |  | . | . |
| . | . |  | . | . |
| . | . |  | . | . |

FIG.5

| SYSTEM | | SystemA | | | | | | | | | | | | | | | | | | | | | | | | |
|---|---|---|---|---|---|---|---|---|---|---|---|---|---|---|---|---|---|---|---|---|---|---|---|---|---|---|
| JOB | | Job1 | | | | | | | | | | | | Job2 | | | | | | Job3 | | | | | | |
| PROGRAM | | Pgm11 | | | | | | | | Pgm12 | | | | Pgm21 | | | | Pgm22 | | Pgm31 | | | | | | |
| SECTION | | Sec111 | | | | Sec112 | | | | Sec121 | | | | Sec211 | | | | Sec221 | | Sec311 | | | | | | |
| STEPs | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| FILE | REC | DATA | | | | | | | | | | | | | | | | | | | | | | | | |
| F1 | R1 | D11 | | | | | | | | | | | | | | | | | | | | | | | | |
| | | | R1 | | | U1 | | | | | | | | | | | | | | | | | | | | | |
| | | D12 | | R1 | | U1 | | | | | | | | | | | | | | | | | | | | |
| | | D13 | | | | | | | | | | | | | | | | | | | | | | | | |
| | | D14 | | | U1 | | | | | | | | | | | | | | | | | | | | | |
| | R2 | D21 | | | | | | | | R5 | | | R1 | | R1 | U2 | U1 | R1 | | U1 | R1 | | | | | |
| | | D22 | | | | | | | Ra | | | | | | | | | Ra | | | | | | | | |
| F2 | R3 | D31 | | | | | | | Ra | U1 | | | | | | | | | | | | C1 | C1 | | | |
| | | D32 | | | | | | | | | | | | | | | | | | | | | C1 | | | | |

|  | ASSOCIATION RELATIONSHIP | | | | |
|---|---|---|---|---|---|
|  |  | REFERENCE | UPDATE | CREATE | DELETE | REDEFINE |
| ASSOCIATION MEDIUM | FILE | 1 | 6 | 10 | 10 |  |
|  | CALL PARAMETER | 2 | 7 | 12 | 12 |  |
|  | COPY PHRASE | 3 | 9 |  |  | 20 |
|  | LOCAL VARIABLE | 50 | 60 |  |  | 90 |

| SYSTEM | SystemA | | | | | | | | | | | | | | | | | | | | | | | | |
|---|---|---|---|---|---|---|---|---|---|---|---|---|---|---|---|---|---|---|---|---|---|---|---|---|---|
| JOB | Job1 | | | | | | | | | | | | Job2 | | | | | | | Job3 | | | | | |
| PROGRAM | Pgm11 | | | | | | | | | Pgm12 | | | Pgm21 | | | | Pgm22 | | | Pgm31 | | | | | |
| SECTION | Sec111 | | | | | | Sec112 | | | Sec121 | | | Sec211 | | | | Sec221 | | | Sec311 | | | | | |
| STEPs | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| FILE | REC | DATA | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| F1 | R1 | D11 |  | 1 |  | 5 |  |  |  | 5 |  |  | 1 |  |  | 1 |  |  | 1 |  |  | 5 |  |  |  |  |  |
|  |  | D12 |  | 1 |  | 5 |  |  |  |  |  |  |  |  |  |  | 10 |  |  |  |  |  | 5 |  |  |  |  |  |
|  |  | D13 |  |  |  |  |  |  |  |  |  |  |  |  |  |  |  | 5 |  |  |  |  |  | 10 |  |  |  |  |
|  |  | D14 |  |  |  | 5 |  |  |  |  |  |  |  |  |  |  |  |  | 10 |  |  |  |  | 10 |  |  |  |  |
|  | R2 | D21 |  |  |  |  |  |  |  | 10 |  |  |  |  |  |  |  |  |  |  |  |  | 10 |  |  |  |  |
|  |  | D22 |  |  |  |  |  |  |  | 10 | 50 |  |  |  |  |  |  |  |  |  |  |  |  | 10 |  |  |  |
| F2 | R3 | D31 |  |  |  |  |  |  |  |  |  |  |  |  |  |  |  |  | 10 |  |  |  |  |  |  |  |  |
|  |  | D32 |  |  |  |  |  |  |  |  |  |  |  |  |  |  |  |  |  |  |  |  |  |  |  |  |  |

FIG.7

| SYSTEM | SystemA | | | | | | | | | | | | | | | | | | | | | | | | | |
|---|---|---|---|---|---|---|---|---|---|---|---|---|---|---|---|---|---|---|---|---|---|---|---|---|---|---|
| JOB | Job1 | | | | | | | | | | | | Job2 | | | | | | Job3 | | | | | | | |
| PROGRAM | Pgm11 | | | | | | | | | Pgm12 | | | | Pgm21 | | | Pgm22 | | | Pgm31 | | | | | | |
| SECTION | Sec111 | | | | | | | Sec112 | | Sec121 | | | | Sec211 | | | Sec221 | | | Sec311 | | | | | | |
| STEPs | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| FILE | REC | DATA | | | | | | | | | | | | | | | | | | | | | | | | | |
| F1 | R1 | D11 | 1 | | | 5 | | | | 5 | | | | | 1 | | | 1 | | | 5 | | | | | |
| | | D12 | 1 | | | 5 | | | | | | | | | | | | | | | 5 | | | | | |
| | | D13 | | | | | | | | | | | | | | | 10 | | | | | | 10 | | | | |
| | | D14 | | | | | | | | | | | | | | | | 5 | | | | | | | | | |
| | R2 | D21 | | | | 5 | | | | | | | 1 | | | | | | | | | | | | | | |
| | | D22 | | | | | | | | 20 | | | | | | | | | 20 | | | | | 20 | | | |
| F2 | R3 | D31 | | | | | | | | 20 | | | | | | | | | | | | 1 | | | | | |
| | | D32 | | | | | | | | 100 | | | | | | | | | | | | | | 20 | | | |

| SYSTEM | | SystemA | | | | | | | | | | | | | | | | |
|---|---|---|---|---|---|---|---|---|---|---|---|---|---|---|---|---|---|---|
| JOB | | Job1 | | | | | | | | Job3 | | | | | Job2 | Job1 | Job2 | |
| PROGRAM | | Pgm11 | | | | | | | | Pgm31 | | | | | Pgm22 | Pgm12 | Pgm21 | |
| SECTION | | Sec111 | | | | | | | Sec112 | Sec311 | | | | | Sec221 | Sec121 | Sec211 | |
| STEPs | | 1 | 2 | 3 | 4 | 5 | 6 | 7 | 8 | 9 | 10 | 11 | 12 | 13 | 14 | 15 | 16 | |
| FILE | REC | DATA | | | | | | | | | | | | | | | | |
| F1 | R1 | D11 | 1 | | | 5 | | | | 5 | | 5 | | | | 1 | | |
| | | D12 | 1 | | | 5 | | | | | | 5 | | | | | | |
| | | D13 | | | | | | | | | | 1 | | | | | 10 | |
| | | D14 | | | | 5 | | | | | | | | | | | | 5 |
| | R2 | D21 | | | | | | | | | | 10 | | | | | | |
| | | D22 | | | | | | | | | | 10 | | | | | | |
| F2 | R3 | D31 | | | | | | | | 20 | | 20 | 20 | | | 20 | | |
| | | D32 | | | | | | | | 20 | 100 | | | | | | | |

| FILE NAME | DATA ITEM NAME | SECTION NAME |
|---|---|---|
| F1 | D11 | Sec111,Sec112,Sec311 |
| F1 | D12 | Sec111,Sec311 |
| F1 | D13 | Sec211 |
| F1 | D14 | Sec211 |
| F1 | D21 | Sec311 |
| F1 | D22 | Sec111,Sec311 |
| F2 | D31 | Sec112,Sec311 |
| F2 | D32 | Sec112,Sec311,Sec221 |

| FILE NAME | DATA ITEM NAME | SECTION NAME | |
|---|---|---|---|
| F1 | D11 | Sec111,Sec112,Sec311 | a |
| F1 | D12 | Sec111,Sec311 | |
| F1 | D13 | Sec211 | d |
| F1 | D14 | Sec211 | |
| F1 | D21 | Sec311 | b |
| F1 | D22 | Sec111,Sec311 | |
| F2 | D31 | Sec112,Sec311 | c |
| F2 | D32 | Sec112,Sec311,Sec221 | |

|     | OBJECT                   |             |             |                    |
|-----|--------------------------|-------------|-------------|--------------------|
|     | obj-1(pgm11,pgm31,pgm22) |             | obj-2(pgm12,pgm21) | |
|     | PRIVATE DATA             | PUBLIC DATA | PUBLIC DATA | PRIVATE DATA       |
| D11 | (REFERENCE,UPDATE)       |             | (REFERENCE) |                    |
| D12 | (REFERENCE,UPDATE)       |             |             |                    |
| D13 |                          |             |             | (REFERENCE,UPDATE) |
| D14 |                          | (REFERENCE) |             | (UPDATE)           |
| D21 | (CREATE)                 |             |             |                    |
| D22 | (CREATE,UPDATE)          |             |             |                    |
| D31 | (CREATE,REFERENCE)       |             |             |                    |
| D32 | (CREATE,REFERENCE,UPDATE)|             |             |                    |

FIG.15

SYSTEM ANALYSIS APPARATUS AND METHOD, AND STORAGE MEDIUM STORING SYSTEM ANALYSIS PROGRAM

TECHNICAL FIELD OF THE INVENTION

The present invention relates to system analysis technology, more particularly to system analysis technology used in order to divide an existing system into reusable subsystems and other resources, for example.

BACKGROUND OF THE INVENTION

Even if an existing system is reorganized, main functions in the new system are not very different from those of the existing system. In this situation, subsystems of the existing system are reused to reduce both of the development costs and development term. In order to reuse subsystems, it is necessary to isolate subsystems required for reuse from the other resources in an enormous existing system. Currently, this isolation of subsystems is carried out using design documents at the time of development and/or the knowledge of development engineers, and highly depends on the know how at the time of design. But such a technique that depends on the human experience cannot definitely identify system resources to be reused, and it sometimes causes additional developments costs and time. There is a very real danger of cost increases during development due to design errors of the interface between the reused portions and the newly development portions in addition to the isolation difficulty.

Also, if there are deficiencies in the design documents and/or mismatches between the design documents and the current system, and/or the developer of the current system is absent, etc., it is not possible to smoothly investigate grouping of the subsystems in the existing system, reuse of the subsystems, new development, and/or application of packaged programs etc. Therefore, the system itself must be analyzed.

Further, now that almost all procedures are integrated into a system, the procedures themselves are incorporated into a black box and relationships between procedures become complicated which means that new development of all procedures is extremely difficult. In this respect a process for analyzing the existing system itself is absolutely essential in reorganization of the existing system.

SUMMARY OF THE INVENTION

The object of the present invention is therefore to provide a system analysis apparatus, method and program for analyzing an existing system.

It is also an object of the present invention to obtain information to be used in partitioning or the like of the existing system, by analyzing the existing system.

A system analysis apparatus for analyzing a system containing one or a plurality of programs, which is a first aspect of the present invention, includes means for examining a data item access state in the program, and an analyzer for analyzing association relationships between processes and data items based on the data item access state. Each of the processes is at least one of a program, a set of programs and a program section. The data items are, for example, data items within data files, data items within telegraphic messages, or data items within subprogram interfaces. In this way, by analyzing association relationships between data items and processes as a system analysis, it is possible to acquire information useful in system partitioning etc. More specifically, it is possible to clarify groups of processes of various units (for example, program sections, programs themselves, JOBs, subsystems, etc.), groups of data items, and association relationships between data items and processes.

The above mentioned analyzer may be configured to includes means for quantifying the types of accesses (for example, reference, update, etc.) to the data items and the number of accesses, which are included in the data item access state, and generating the quantified data item access state data. It is possible to display the association degrees between data items and processes as a result of the quantification.

The above mentioned analyzer may also be configured to further include means for correcting the quantified data item access state data according to external requirements including system design requirements. This is in order to designate portions that are to be associated according to the external requirements such as system design requirements.

The above mentioned analyzer may also be configured to further include means for collecting processes which access to a data item satisfying a predetermined condition in the quantified data item access state data.

Still further, the above mentioned analyzer may also configured to include means for presenting at least one of a partitioning pattern of the data items and a division pattern of the processes, using the quantified data item access state data and collected process information.

It is also possible that the system analysis apparatus of the first aspect of the present invention further includes means for presenting a process interface in the presented process division pattern. This is useful in the design of interfaces at the time of system partitioning.

The system analysis method, which is the second aspect of the present invention, includes the steps of: examining a data item access state in the program, and analyzing association relationships between processes and data items based on the data item access state, wherein each of the processes is at least one of a program, a set of programs and a program section. Variations stated above for the first aspect of the present invention can be applied to the second aspect of the present invention.

This method may be provided as a program that is executed by a computer. In this case, the program is stored in a storage medium or a storage device, such as a floppy disk, CD-ROM, magneto-optical disk, semiconductor memory or hard disk.

BRIEF DESCRIPTION OF THE DRAWINGS

FIG. 5 is a drawing showing a data item access state table at the first stage;

FIG. 7 is a drawing showing a data item access state table at the second stage;

FIG. 8 is a drawing showing a data item access state table at the third stage;

FIG. 10 is a drawing showing a data item access state table at the fourth stage;

FIG. 15 shows an example of a process interface display of the present invention.

DETAILED DESCRIPTION OF THE PREFERRED EMBODIMENTS

Figure 1:
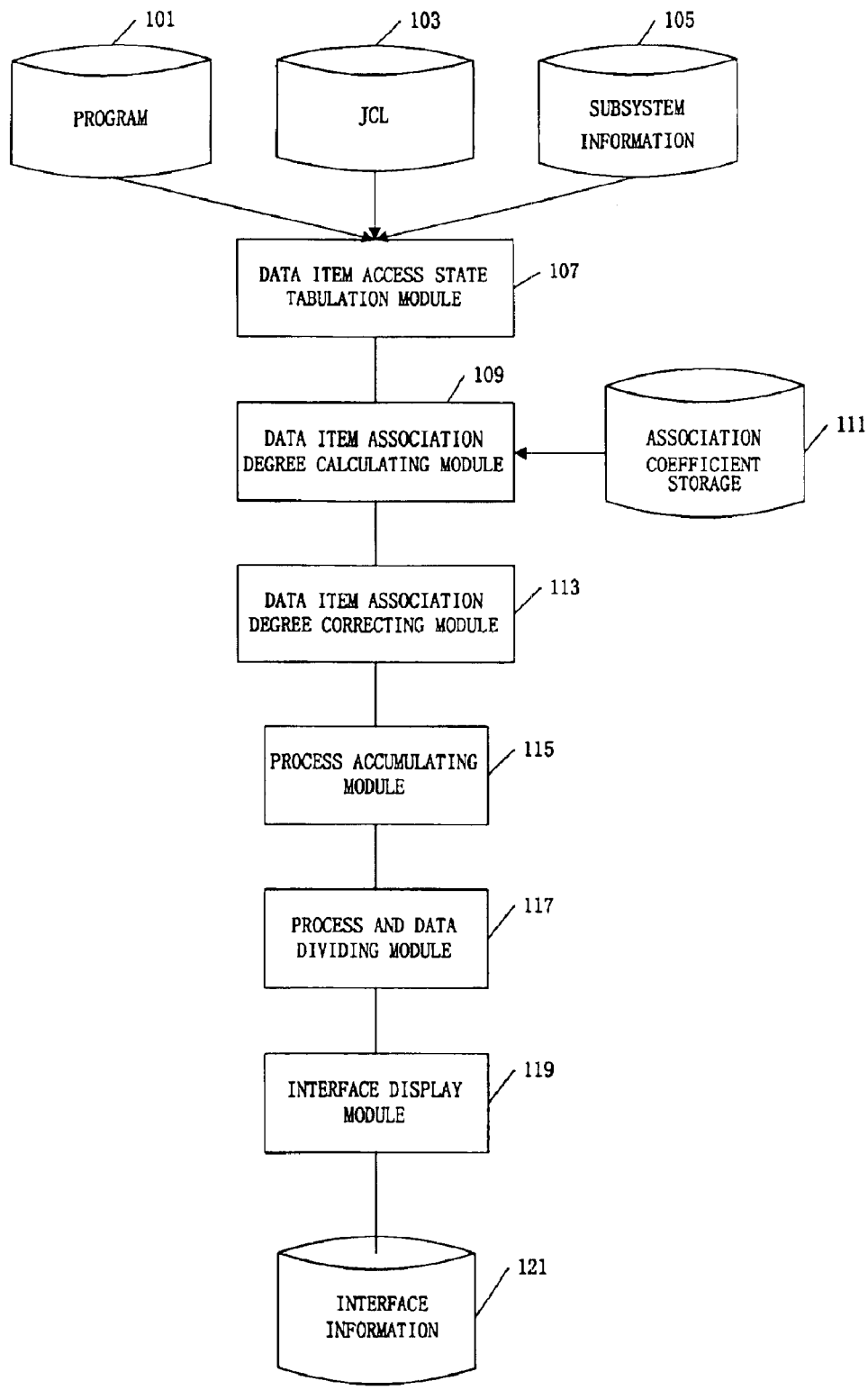
FIG. 1 is a functional block diagram of the present invention.

A functional block diagram of the present invention is shown in FIG. 1. Inputs are a program 101, JCL (Job Control Language) 103 and subsystem information 105 used in an existing system. A data item access state tabulation module 107 uses these inputs. Output of the data item access state tabulation module 107 is input to a data item association degree calculating module 109. The data item association degree calculating module 109 performs computation using specially prepared association coefficients. The association coefficients are stored in an association coefficient storage 111. The result of the computation by the data item association degree calculating module 109 is output to a data item association degree correcting module 113. The data item association degree correcting module 113 outputs a result to a process accumulating module 115 after carrying out correction processing. The process accumulating module 115 outputs a result of accumulation processing to a process and data dividing module 117. A processing result of the process and data dividing module 117 is output to an interface display module 119. A processing result of the interface display module 119 is displayed as interface information, and stored in a storage device. The processing result from each module is also stored in the storage device.

The data item access state tabulation module 107 forms the number of accesses, type of access and at what stage the access was made, to each data item, into a table, using (a) the program 101 which is a source program, (b) the JCL 103 which defines names of the programs to be executed, control parameters, and data sets allocated to the programs etc., and (c) the subsystem information 105 which includes subsystem names and information about JOB dependent on the subsystem. The data item association degree calculating module 109 quantifies the data item access state using access type (for example reference, update) and the number of accesses. Since there is an association degree strength for each access type, the data item association degree calculating module 109 calculates a production of an association coefficient corresponding to the access type and the number of accesses by referring to the association coefficient storage 111 which stores the association degree strength (association coefficient) defined for each access type in advance.

The data item association degree correcting module 113 corrects the association degrees related to portions that are to be strongly associated, using input of external requirements such as system design requirements. For example, in the case where the data amount of a particular data item is large compared to others, processing is carried out to cause the association degree for that data item to be increased, or the like. The process accumulating module 115 collects processes that access to data items satisfying a predetermined condition, and gathers the processes together in the data item access state data. By gathering the processes together, it becomes easy to understand the group of the data items and processes. Therefore the process and data dividing module 117 carries out process division and data item partition. Since the interface between the processes is made clear as a result of this process division, the interface display module 119 displays the interface.

Figure 2:
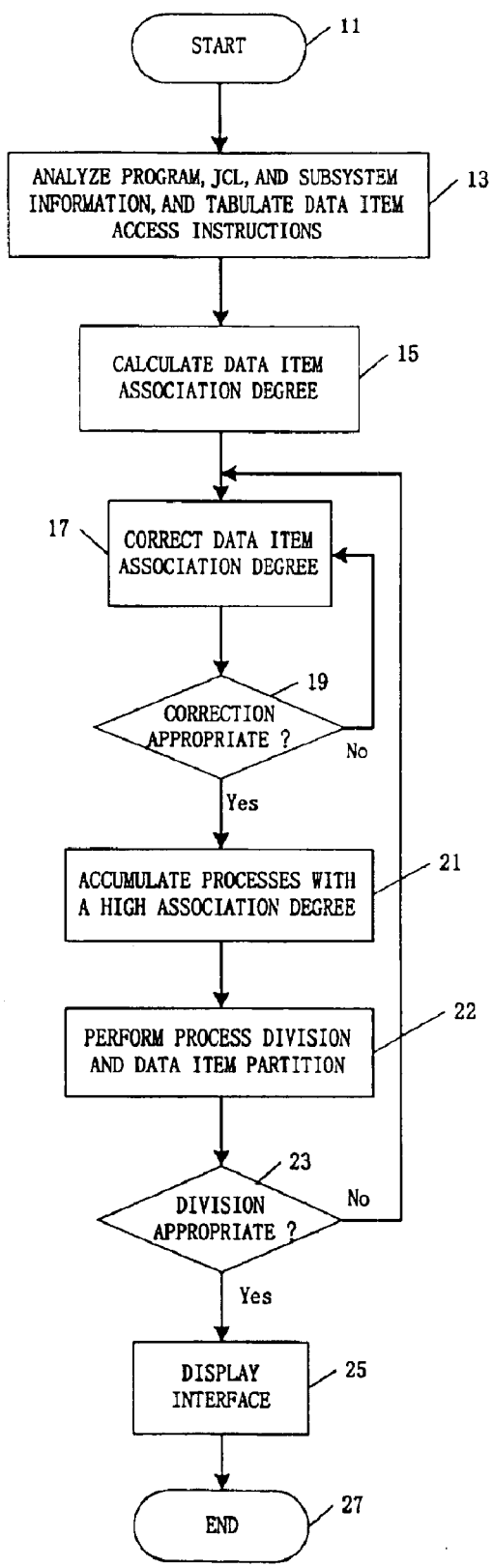
FIG. 2 is an overall process flowchart of the present invention.

The overall process flow of the present invention is shown in FIG. 2, and a detailed description of each step will now be given. First of all, the data item access state tabulation module 107 analyzes the program 101, JCL 103 and subsystem information 105, and tabulates data item access instructions (step 13). An example of this process flow is shown in FIG. 3.

Figures 3, 4:
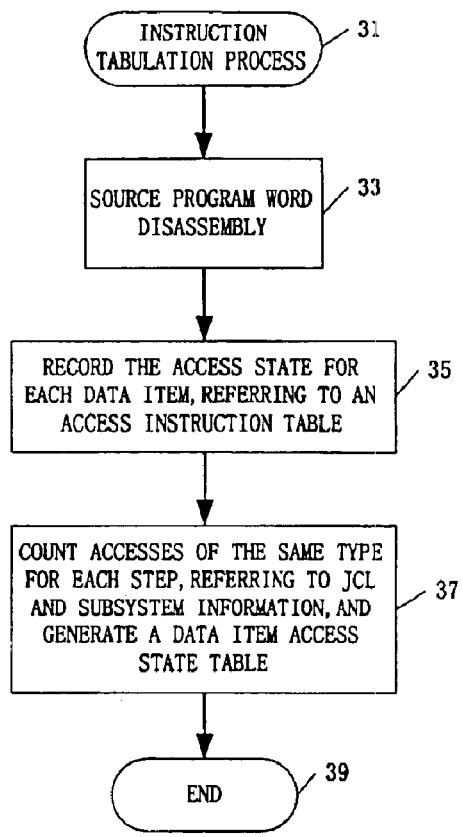
FIG. 3 is a flow chart of an instruction tabulating process of the present invention.
FIG. 4 is a drawing showing an example of data recorded during instruction tabulation.

First of all, word disassembly is carried out for a source program written in a programming language, such as COBOL (step 33 in FIG. 3). That is, the source program is disassembled into each instruction. Then, referring to an access instruction table, access states for each data item are stored (step 35). The access instruction table lists instruction groups to be handled as access instruction, such as data referencing instructions (for example READ, GET), data creating instructions (for example WRITE, STORE), data update instructions (for example, REWRITE, MODIFY), data delete instructions (for example DELETE), and data redefining instructions (for example REDEFINE). That is, each instruction enumerated in the access instruction table is recorded, as shown in FIG. 4, for example. Specifically, a program name, section names in that program, step names in those sections, data items accessed and the types of those accesses, are recorded in a storage device. In the example of FIG. 4, section Sec111 of a program called Pgm11 is currently being analyzed, and in step 1 there are reference accesses to data items D11 and D12, and in step 4 there are update accesses to data items D11, D12 and D22. FIG. 4 shows that analysis is in progress, and after the state shown in FIG. 4, the access state for all programs included in the system to be analyzed is recorded.

In step 35, if the access state is recorded for each access, the JCL 103 and the subsystem information 105 are also referenced, and accesses of the same type in each step are counted and a data item access state table is generated (step 37). The data item access state table is a table as shown, for example FIG. 5, and is stored in a storage device. FIG. 5 is a data item access state table for a system called System A. System A contains jobs Job1, Job2, and Job3. Further, Job1 contains programs Pgm11 and Pgm12, Job2 contains programs Pgm21 and Pgm22, and Job3 contains program Pgm31. This information is acquired by referencing the JCL103 and the subsystem information 105. Program Pgm11 contains sections Sec111 and Sec22 program Pgm12 contains section Sec121, program Pgm21 contains section Sec211, program Rgm22 contains section Sec221, and program Pgm31 contains section 311. Further section Sec111 contains steps 1 to 7, section Sec112 contains steps 8 to 10, section Sec121 contains steps 11 to 13, section Sec211 contains steps 14 to 16, section Sec221 contains steps 17 and 19, and section Sec311 contains steps 20 to 25. The steps are represented by serial numbers for each process unit within a section. This information is recorded in the processing of step 35, as shown in FIG. 4.

On the other hand, file F1 contains records R1 and R2, and file F2 contains record R3. Record R1 includes data items D11 to D14, record R2 includes data items D21 and D22, and record R3 includes data items D31 and D32. This information is acquired from the file structure. If there are reference (for example, READ) access, R is recorded in the table of FIG. 5, U is recorded if there are update (for example, UPDATE) accesses, and C is recorded if there are create accesses. Although not used in FIG. 5, D is recorded if there are delete accesses, and A is recorded if there are redefine accesses. The number of accesses is recorded after the letter representing the type of access. R5 indicates that there are five reference accesses. If a small letter a is recorded after the above described alphabetical letters, it means all record processing.

After the data item access state table such as shown in FIG. 5 has been generated, the data item association degree calculating module 109 refers to the association coefficient storage 111 and calculates the degree of data item association (Step 15 in FIG. 2). The degree of association has certain strength depending on the access type, and an association coefficient expresses this strength. Generally, the association degree of an updating access is stronger than that of a reference access and the association degree of create access and delete access is stronger than that of updating access. Also, the association degree of a data item used in a CALL parameter for calling a subprogram is stronger than that of the file access, and the association degree of the shared COPY phrase or local variable is further stronger. Accordingly, the following size relationships exist.

Figures 6, 9:
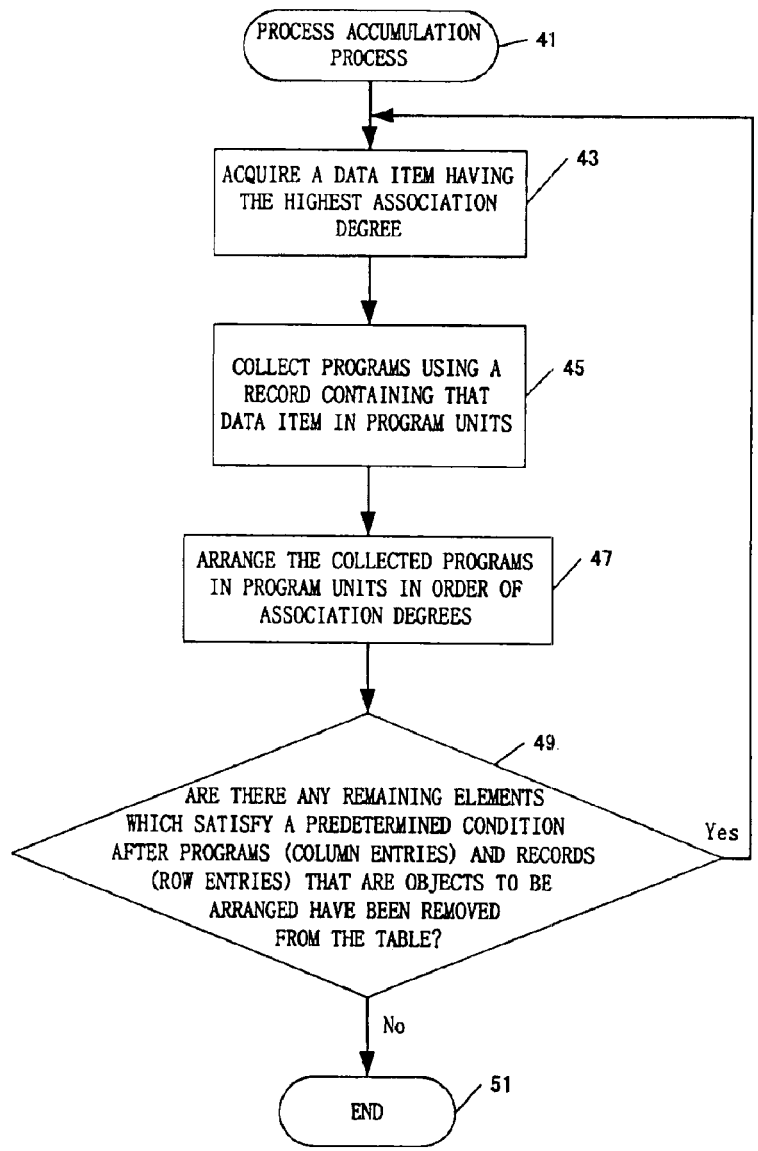
FIG. 6 is a drawing showing an example of an association coefficient table of the present invention.
FIG. 9 is a flowchart of process accumulation processing of the present invention.

For association relationships:
reference<update<create=delete<redefine
For association media:
File<CALL parameter<COPY phase<local variable Based on these size relationships, the specific association coefficients such as shown in FIG. 6 are prepared. However, it is also possible to use numerical values that are different from those in the example of FIG. 6. Further, it is also possible to change the above described size relationships according to some conditions.

In step 15, access types and numbers of accesses tabulated in the data item access state table (FIG. 5) are quantified by multiplying association coefficients corresponding to the access types and numbers of accesses. In the example of FIG. 5, since there are only file accesses, other association media are not used in this example. The quantification results are shown in FIG. 7. The quantified data item access state table is stored in the storage device. For example, in the case of U2 in FIG. 5, since it is an update access, the association coefficient is five and the number of accesses is two, so the degree of association becomes 10. Also, in this example, in the case of all record processing, calculation is carried out with the number of accesses being 10. That is, Ra has an association coefficient of 1, and with the number of accesses as 10 the degree of association becomes 10.

Next the data item association degree correcting module 113 corrects the association degrees in the data item access state table (step 17 in FIG. 2). The association degrees between processes and data have a strength depending not only on the type and number of accesses to data, but also according to the amount of data and response time to be cleared in the system requirement. It is necessary to correct the association degrees in the data item access state table acquired in step 15, taking such system design requirements into consideration. For example, with data items having a large data amount, the association degree is increased in accordance with the data amount. In the example of FIG. 7, since the data amount of file F2 is large, the association degrees for data items included in this file F2 are doubled. The data item access states table after performing correction to double the association degrees is shown in FIG. 8.

If system design requirements includes, such as for example, a requirement that particular processes or data must be associated with each other, it is possible to partition processes or data under that type of restriction. However, if processing subsequent to this embodiment is carried out after causing association degrees of individual data items to be increased (or decreased) as in this example, it becomes possible to find association relationships for data items and processes (for examples between data items, between processes, and between data items and processes) that are completely hidden in cases where explicit association is applied. However, it is also possible to carry out process accumulation (step 21) without carrying out this correction (step 17).

Then, it is confirmed whether or not correction is appropriate (step 19). If correction is not appropriate, processing returns to step 17 and correction is carried out again. Whether or not the correction is appropriate depends upon whether or not subsequent processing, for example process accumulation, is possible.

Next, the process accumulating module 115 accumulates processes with a high association degree (step 21). For example, the processing shown in FIG. 9 is carried out. First of all, a data item with the highest association degree is acquired (step 43). In the example of FIG. 8, this is data item D32. Next, programs using a record containing this data item are collected together in program units (step 45). In the case of FIG. 8, the record that contains the data item D32 is record R3, and programs that use record R3 are Pgm11, Pgm22 and Pgm31. Next, the collected programs are arranged in program units in order of those association degrees (step 47). Program Pgm11 has association degree 140, Pgm22 has association degree 30, and Pgm31 has association degree 40, and therefore they are arranged in the order Pgm11, Pgm31, Pgm22.

It is then judged whether or not there are any remaining elements which satisfy a predetermined condition after programs (column entries in the data item access state table) and records (row entries) that are objects to be arranged have been removed from the table (step 49). In the example of FIG. 8, the programs Pgm11, Pgm31 and Pgm22 are removed as the column entries, which means that Pgm12 and Pgm21 remain. Also, record R3 is removed as the row entries, so records R1 and R2 remain. If there are elements in these remaining portions with association degree larger than a specified threshold value, processing returns to step 43. In the example of FIG. 8, the maximum association degree of the remaining portions is 10. Processing is terminated, as this is smaller than the threshold value.

The result of step 21 is shown in FIG. 10. In step 21, program columns in the data item access state table that are to be arranged are all moved. Accordingly, as shown in FIG. 10, the programs become arranged Pgm31 next to Pgm11, and with Pgm22 next to Pgm31. On the other hand, programs other than those that are to be arranged are not subjected to any further arrangement, which means that Pgm12 and Pgm21 are arranged in numerical order, so Pgm21 is after Pgm12. JOB names are rewritten in accordance with the programs that are arranged. Obviously, sections and steps within the programs are also shifted in accordance with arranging and shifting of programs. If this type of arrangement is carried out, it becomes clear that there is a bias towards data items being used by every program. The data item access state table of FIG. 10 is stored in the storage device.

In the example of FIG. 9, programs have been grouped together based on a record containing the data item with the highest association degree, but it is also possible to group programs together based on other units, for example data items. Also, programs have been grouped together in program units, but it is also possible to group them together in section units or JOB units.

Returning to FIG. 2, the process and data dividing module 117 performs process division and data item partition (step 22). One example of this processing will be described in detail using FIG. 11.

Figures 11, 12, 13:
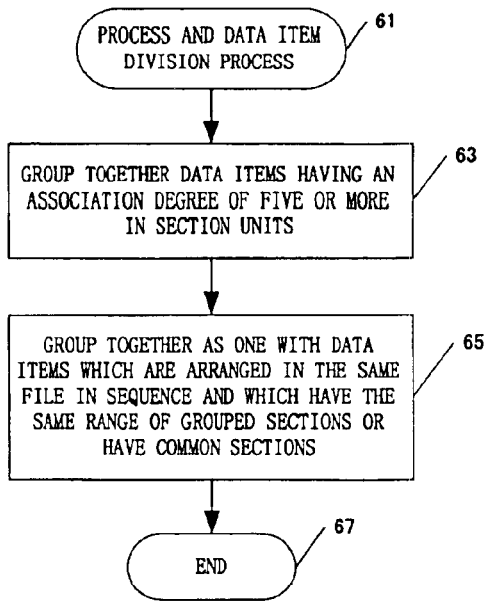
FIG. 11 is a flowchart of process and data item division processing of the present invention.
FIG. 12 shows an example of data recorded during process and data item division processing.
FIG. 13 shows an example of data recorded during process and data item division processing.

First of all, data items having an association degree of 5 or more are grouped together in section units (step 63). If step 63 is carried out, the processing result for FIG. 10 is shown in FIG. 12. Specifically, data item D11 has an association degree of 5 or more in sections Sec111, Sec112 and Sec311. Data item D12 has an association degree of 5 or more in sections Sec111 and Sec311. Data item D13 has an association degree of 5 or more in section Sec211. Data item D14 has an association degree of 5 or more in section Sec211. Data item D21 has an association degree of 5 or more in section Sec311. Data item D22 has an association degree of 5 or more in sections Sec111 and Sec311. Data item D31 has an association degree of 5 or more in sections Sec112 and Sec311. Data item D32 has an association degree of 5 or more in sections Sec112, Sec311 and Sec221.

Then, data items are grouped together as one if data items are arranged in the same file in sequence and one of the following conditions is satisfied (step 65).
Condition 1: the range of grouped sections is the same.
Condition 2: there are common sections.
For example, processing is carried out sequentially from the upper line in FIG. 12. Because the first and second lines list data items of the same file F1 and there are common sections, the data items are grouped together (range a). The third line is for a data item in the same file F1, but the range of grouped sections is not the same and there is no common section, which means that the lines from the first to the third line can not be grouped together. If the third and fourth lines are compared, both data items in the third and fourth lines are in the same file F1 and the range of grouped sections is the same, so they can be grouped together (range d). Data items from the third to the fifth line are in the same file F1, but the range of grouped sections in not the same and there is no common section, so they can not be grouped together.

If the fifth line and the sixth line are compared, data items of the same file F1 are listed, and a common section exists in the grouped section range, therefore the fifth line and the sixth line are grouped together (range b). There is a file boundary between the sixth line and the seventh line, and so the seventh line and the eighth line are compared. Looking at the seventh line and the eighth line, data items of the same file F2 are listed, and sections Sec112 and Sec311 are shared, therefore the seventh line and the eight line are grouped together (range c). The above described groupings are illustrated in FIG. 13. The information in FIG. 12 and FIG. 13 is stored in the storage device.

Figure 14:
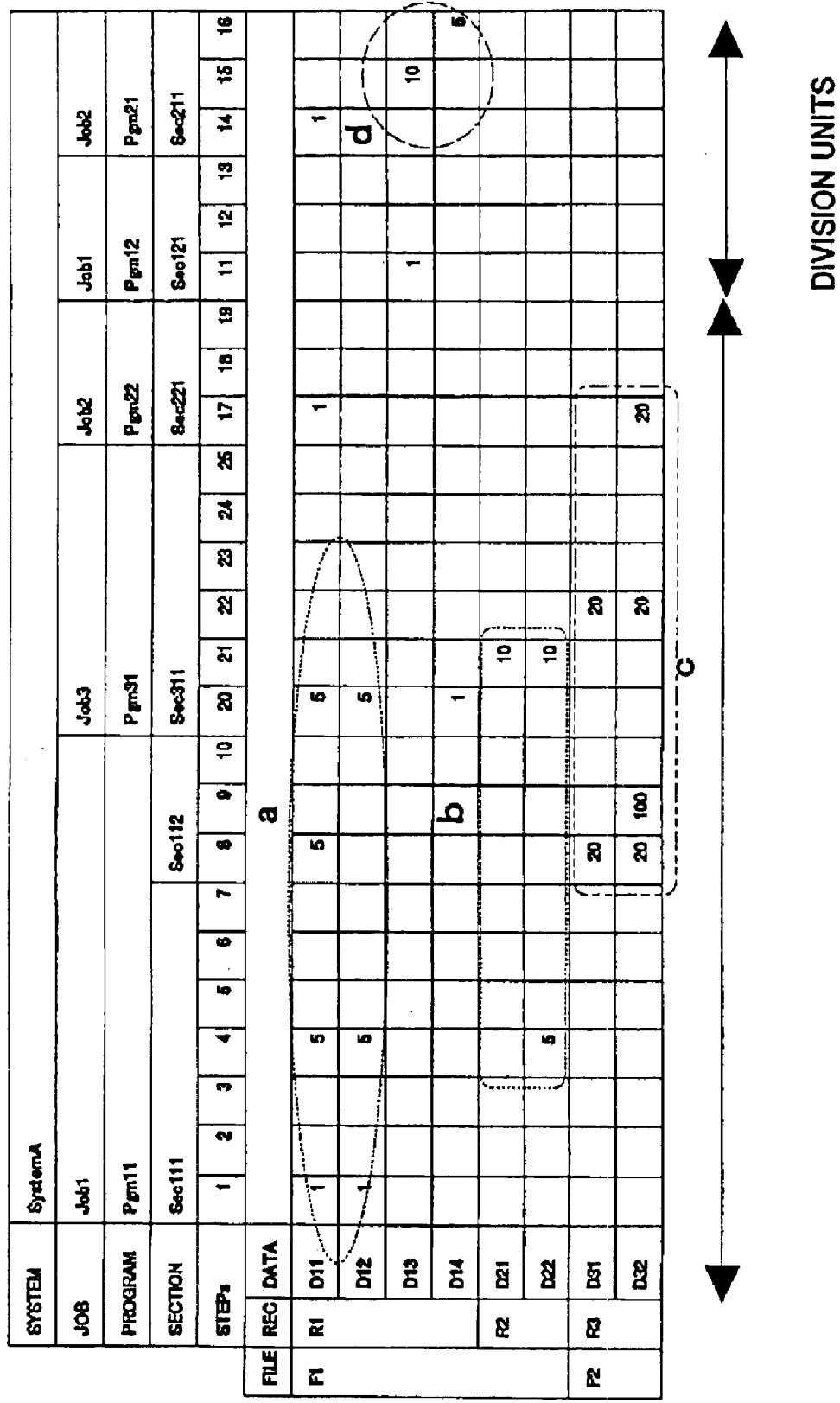
FIG. 14 is a drawing showing a data item access state table at the fifth stage.

The ranges a to d are shown in the data item access state table in FIG. 14. In the processing of FIG. 11, sections are gathered together for each data item, so association relationships between data items become clear. Association relationships between data items and processes are also shown. In the example of FIG. 14, the association degree between data item D11 and data item D12 is strong, and processes which are strongly associated with these data items D11 and D12 are sections Sec111, Sec112 and Sec311, or programs Pgm11 and Pgm31 (range a). Also, the association degree between data item D13 and data item D14 is strong, and processes which are strongly associated with these data items D13 and D14 are section Sec211 or program Pgm21 (range d). The degree association between data item D21 and data item D22 is strong, and processes which are strongly associated with these data items D21 and D22 are sections Sec111, and Sec311, or programs Pgm11 and Pgm31 (range b). The association degree between data item D31 and data item D32 is strong, and processes which are strongly associated with these data items D31 and D32 are sections Sec112, Sec311 and Sec221, or programs Pgm11, Pgm31 and Pgm22 (range c). It is also possible to configure the present invention to display this table to a user.

By grouping in this manner, it will be understood that data items D11 and D12, and D12 and D13 in record R1 are separated, and that they can be placed in different records.

In FIG. 11, data items with an association degree of 5 or more are searched for, but this is only one example and it is also possible to change the value according to conditions of the system to be analyzed. In addition, in the above example, data items are together in section units, but it is also possible to group in program units.

It is also possible to divide processes by using the above ranges a to d. As will be understood from reference to FIG. 14, program Pgm31 or section Sec311 is included in range a to range c, but is not included in range d. Accordingly, it will be understood that it is possible to carry out process division to programs Pgm11, Pgm31 and Pgm22 (or sections Sec111, Sec112 Sec311 and Sec221) derived from ranges a to c, and Pgm21 (or Sec211) derived from range d. Program Pgm12 (or Sec121) does not belong to any range. However, Program Pgm12 (or Sec121) uses data item D13, and data items D13 and D14 are strongly associated with program Pgm21. Therefore, Pgm12 is grouped with Pgm21. In FIG. 14, a group of Pgm11, Pgm31 and Pgm22, and a group of Pgm12 and Pgm21 are shown as division units.

A more detailed description of the processing described in the above paragraph will now be given. (1) Sections having a high association degree are collected together based on data items D11 and D12. These are Sec111, Sec112 and Sec311. (2) Sections having a high association degree are collected together based on data items D21 and D22. These are Sec111 and Sec311. (3) Sections having a high association degree are collected together based on data items D31 and D32. These are Sec112, Sec311 and Sec221 (4) Section Sec311 is shared by all three of these section groups, so sections strongly associated with data items D11 and D12, D21 and D22, and D31 and D32 are collected together. These are sections Sec111, Sec112, Sec311 and Sec221. In program units this becomes Pgm11, Pgm31 and Pgm22. (5) Sections having a high association degree are collected together based on D13 and D14. This is section 211. Portions with an association degree of 1 are only weakly associated, so they are not collected together (sections Sec311 and Sec121). It will be understood that Sec211 has a weak association degree with other data items. (6) Because section Sec121 has no data items with a strong association degree, and there is a reference to data item D13, it is put into the same group as Sec211 that is strongly associated with D13 and D14. In program units, programs Pgm21 and Pgm12 are in the same group. Therefore, the sections are divided into two division units, namely the group containing Sec111, Sec112 Sec311 and the group containing Sec221, and Sec211 and Sec121.

Returning to FIG. 2, after step 22 has been executed, it is judged whether or not division is appropriate (step 23). If division is not appropriate, processing returns to step 17. Whether or not division is appropriate is determined by judging whether the system design requirements are satisfied, for example. Division is also judged to be not appropriate if division was not possible in step 22.

If it is judged in step 23 that partitioning is appropriate, the interface display module 119 displays an interface (step 25). Here, processes divided in step 22 and data used by the processes are displayed. An example of an interface is shown is FIG. 15. In program units, processes that have been divided are Pgm11, Pgm31 and Pgm22, and Pgm12 and Pgm21. With divided processes as objects, the first group is made object Obj-1, and the second group is made object Obj-2. Data items are public data, which is external data used as interfaces to processes other than the associated processes, and private data, which is internal data used only within the associated processes.

Looking at the division units of FIG. 14, data items D11 and D12 are private data in object Obj-1, but data item D11 is public data in object Obj-2. On the other hand, data items D13 and D14 are private data in object Obj-2, but data item D14 is public data in object Obj-1. Also, D21 and D22, and D31 and D32 are private data in object Obj-1. The partition of data items and division of processes are also shown in the interface display.

In the interface display, the access types such as reference or update, etc. are indicated on behalf of the values of the association degree shown in FIG. 14. In this way, it becomes clear what type of accesses occur for private data and public data. In FIG. 15, public data is for reference only, and it will also be understood that the association degrees for external processes are low. By dividing into objects, it becomes possible to apply object-oriented technology etc.

In this way, the process interface becomes clear after the division, and it is possible to make use of this in new system design. If clear interface is presented in this way, it becomes easy to decide on the specification of objects that are components, and reductions in design errors can be anticipated.

If each of the above described steps in FIG. 2 are programmed, the present invention can be implemented as a software program. This program is stored in, for example, a storage medium or storage device such as a floppy disk, CD-ROM, Magneto-optical disk, semiconductor memory, hard disk, etc. The program is then executed by a computer. A computer for executing the system analysis program of the present invention can operate as a system analyzer.

It is also possible to implement each function shown in FIG. 1 as a special electronic circuit, or as a combination of electronic circuits and programs, and realize the system analyzer of

What is claimed is:

1. A system analysis apparatus analyzing a system containing one or a plurality of programs, comprising:
   means for examining, as an access state of a data item in said program, an access type and a number of accesses of the data item in said program; and
   an analyzer analyzing degree of association relationships between processes and data items based on the access type and the number of accesses of the data item, each said process being at least one of a program, a set of programs and a program section,
   wherein said analyzer further comprises:
      means for quantifying the type of access to the data item and the number of accesses, as recorded separately for each process, which are included in said data item access state, and generating quantified data item access state data of each process in said program;
      means for collecting processes that access to a data item satisfying a predetermined condition in said quantified data item access state data; and
      means for presenting at least one of a partitioning pattern of the data items and a division pattern of the processes, using the quantified data item access state data and the corrected processes.

2. The system analysis apparatus of claim 1, wherein said analyzer further comprises:
   means for correcting said quantified data item access state data according to an external requirement including a system design requirement.

3. The system analysis apparatus of claim 1, further comprising:
   means for presenting a process interface in the presented division pattern of the processes, displaying distinction between public data and private data, said public data being external data used as interfaces to processes in an other division, and said private data being internal data used only within processes in a division.

4. A system analysis method analyzing a system containing one or a plurality of programs, comprising:
   examining, as an access state of a data item in said program, an access type and a number of accesses of the data item in the program; and
   analyzing degree of association relationships between processes and data items based on said access type and the number of accesses of the data item, each said process being at least one of a program, a set of programs and a program section,
   wherein said analyzing further comprises:
      quantifying the type of access to the data item and the number of accesses, as recorded separately for each process, which are included in said data item access state, and generating quantified data item access state data of each process in said program;
      collecting processes that access to a data item satisfying a predetermined condition in said quantified data item access state data; and
      presenting at least one of a partitioning pattern of the data items and a division pattern of the processes, using the quantified data item access state data and the collected processes.

5. The system analysis method of claim 4, wherein said analyzing further comprises:
   correcting said quantified data item access state data according to an external requirement including a system design requirement.

6. The system analysis method of claim 4, further comprising:
   presenting a process interface in the presented division pattern of the processes, displaying distinction between public data and private data, said public data being external data used as interfaces to processes in an other division, and said private data being internal data used only within processes in a division.

7. A storage medium storing an analysis program for analyzing a system containing one or a plurality of programs, said analysis program causing a computer to execute operations comprising:
   examining, as an access state of a data item in said program, an access type and a number of accesses of the data item in the program; and
   analyzing degree of association relationships between processes and data items based on said access type and the number of accesses of the data item, each said process being at least one of a program, a set of programs and a program section,
   wherein said analyzing further comprises:
      quantifying the type of access to the data item and the number of accesses, as recorded separately for each process, which are included in said data item access state, and generating quantified data item access state data of each process in said program;
      collecting processes that access to a data item satisfying a predetermined condition in said quantified data item access state data; and
      presenting at least one of a partitioning pattern of the data items and division pattern of the processes, using the quantified data item access state data and the collected processes.

8. The storage medium of claim 7, wherein said analyzing further comprises:
   correcting said quantified data item access state data according to an external requirement including a system design requirement.

9. The storage medium of claim 7, wherein said analysis program causes said computer to further execute operations comprising:
   presenting a process interface in the presented division pattern of the processes, displaying distinction between public data and private data, said public data being external data used as interfaces to processes in an other division, and the private data being internal data used only within processes in a division.

10. A system analysis apparatus analyzing a system containing at least one program, comprising:

a programmed computer processor controlling the system analysis apparatus according to a process comprising:

examining, as an access state of a data item in the least one program, an access type and a number of accesses of the data item in the at least one program, and analyzing degree of association relationships between processes of the at least one program and the data item based on said access type and the number of accesses of the data item, each process of the at least one program being at least one of a program, a set of programs and a program section, of the at least one program;

wherein said analyzing further comprises:

quantifying the type of access to the data item and the number of accesses, as recorded separately for each process, which are included in said data item access state, and generating quantified data item access state data of each process in said program;

collecting processes that access to a data item satisfying a predetermined condition in said quantified data item access state data; and presenting at least one of a partitioning pattern of the data items and a division pattern of the processes, using the quantified data item access state data and the collected processes.

* * * * *

UNITED STATES PATENT AND TRADEMARK OFFICE
CERTIFICATE OF CORRECTION

PATENT NO. : 6,922,825 B1
DATED : July 26, 2005
INVENTOR(S) : Jyunichi Kamakura et al.

It is certified that error appears in the above-identified patent and that said Letters Patent is hereby corrected as shown below:

<u>Title page,</u>
Item [57], ABSTRACT,
Line 10, change "valves" to -- values --.

<u>Column 9,</u>
Line 44, change "corrected" to -- collected --.

<u>Column 11,</u>
Line 3, after "in the" insert -- at --.

Signed and Sealed this

Twenty-eighth Day of March, 2006

JON W. DUDAS
*Director of the United States Patent and Trademark Office*